US010332192B2

(12) United States Patent
Zolotov (10) Patent No.: US 10,332,192 B2
(45) Date of Patent: Jun. 25, 2019

(54) METHODS AND SYSTEMS FOR LOCATING A MOBILE MERCHANT

(71) Applicant: MasterCard International Incorporated, Purchase, NY (US)

(72) Inventor: Andrey Zolotov, St. Louis, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 542 days.

(21) Appl. No.: 14/997,139

(22) Filed: Jan. 15, 2016

(65) Prior Publication Data

US 2017/0206593 A1 Jul. 20, 2017

(51) Int. Cl.
*G06Q 30/00* (2012.01)
*G06Q 30/06* (2012.01)
*G01S 19/13* (2010.01)

(52) U.S. Cl.
CPC .......... *G06Q 30/0639* (2013.01); *G01S 19/13* (2013.01); *G06Q 30/0641* (2013.01)

(58) Field of Classification Search
CPC . G06Q 30/0639; G06Q 30/0641; G01S 19/13
USPC ...................................................... 705/26, 27
See application file for complete search history.

(56) References Cited

U.S. PATENT DOCUMENTS

| 6,980,812 | B1 | 12/2005 | Sandhu et al. |
| 7,305,350 | B1 | 12/2007 | Bruecken |
| 8,732,042 | B2 | 5/2014 | Hammad et al. |
| 9,060,248 | B1* | 6/2015 | Coulombe ............ H04W 4/021 |
| 9,424,603 | B2* | 8/2016 | Hammad ........... G06Q 30/0639 |
| 9,652,791 | B1* | 5/2017 | Brock ................ G06Q 30/0601 |
| 2005/0075119 | A1* | 4/2005 | Sheha .................... G01C 21/26 |
| | | | 455/456.6 |
| 2008/0154706 | A1 | 6/2008 | Bruecken |
| 2011/0184741 | A1 | 7/2011 | Lin et al. |

(Continued)

FOREIGN PATENT DOCUMENTS

JP     2003122991 A     4/2003

OTHER PUBLICATIONS

"Method and System for Dynamic Estimation and Predictive Route Generation" in Patent Application Approval Process, Telecommunications Weekly [Atlanta] Aug. 29, 2012; ProQuest Dialog #1034694342, 10pgs. (Year: 2012).*

*Primary Examiner* — Robert M Pond
(74) *Attorney, Agent, or Firm* — Armstrong Teasdale LLP (57) ABSTRACT

A computer-based method for determining a location of a mobile merchant computing device is provided. The method is implemented using a location manager (LM) computing device in communication with a processor and a memory device. The method comprises receiving from the mobile merchant computing device at least one authorization request message including a merchant identifier for the mobile merchant and a first location variable, determining a location of the mobile merchant using the first location variable, transmitting to a consumer computing device operable by a consumer, by the LM computing device, a location data message including the merchant identifier and the location of the mobile merchant, and causing, by the transmission, the consumer computing device to display the location on a display interface coupled to the consumer computing device.

20 Claims, 7 Drawing Sheets

(56) References Cited

U.S. PATENT DOCUMENTS

| | | | |
|---|---|---|---|
| 2013/0027227 A1* | 1/2013 | Nordstrom | G08G 1/202 340/990 |
| 2013/0246220 A1* | 9/2013 | Hammad | G06Q 30/0639 705/26.9 |
| 2013/0332279 A1* | 12/2013 | Kuusela | G06Q 30/02 705/14.57 |
| 2014/0011522 A1* | 1/2014 | Lin | H04W 4/023 455/456.2 |
| 2014/0089050 A1* | 3/2014 | Akin | G06Q 30/02 705/7.34 |
| 2014/0164119 A1 | 6/2014 | Narayanan et al. | |
| 2015/0006358 A1 | 1/2015 | Oshry et al. | |
| 2015/0032561 A1* | 1/2015 | Yu | G06Q 30/0601 705/26.1 |
| 2015/0120504 A1 | 4/2015 | Todasco | |
| 2015/0348004 A1 | 12/2015 | Eramian | |

\* cited by examiner

METHODS AND SYSTEMS FOR LOCATING A MOBILE MERCHANT

BACKGROUND

This disclosure relates generally to the field of mobile payment transaction systems, and more specifically to network-based systems and methods for using transaction data transmissions to locate mobile merchants.

Mobile merchants are often vehicle-based and may relocate their vehicle frequently. For example, a mobile merchant operating a food truck may drive the food truck to different locations in a city. Consumers buy goods or services from the mobile merchant when the mobile merchant is in their vicinity. However, consumers of goods and services are unable to easily determine when the mobile merchant will be in their vicinity again in the future. Consumers may query the mobile merchant for location information (e.g., through a phone number or a website). However, this becomes cumbersome, because it requires periodic querying with no guarantee of success and the mobile merchant must constantly store, update, and transmit location information. Querying the merchant current locations becomes even more tedious when a consumer wishes to locate several different merchants. Locating mobile merchants that do not broadcast location information may be impossible. Finally, a consumer cannot query a mobile merchant that the consumer is not aware of, which is a significant problem when mobile merchants that may be of interest to the consumer are in the consumer's vicinity and the consumer is unaware of it.

At least some known ways of providing a mobile merchant's location involve the mobile merchant using a separate service to provide their location to consumers. Such methods are limited in that consumers have difficulty locating particular mobile merchants unless they subscribe to the specific location service. Moreover, these known systems are limited because, in many cases, the mobile merchant provides its location and then relocates, and the provided location is inaccurate until the mobile merchant takes time away from its business to provide an update to the service provider. In the interim, consumers receive inaccurate information, limiting the utility of these known location methods.

BRIEF DESCRIPTION

In one aspect, a computer-based method for determining a location of a mobile merchant computing device is provided. The method is implemented using a location manager (LM) computing device in communication with a processor and a memory device. The method comprises receiving from the mobile merchant computing device at least one authorization request message including a merchant identifier for the mobile merchant and a first location variable, determining a location of the mobile merchant using the first location variable, transmitting to a consumer computing device operable by a consumer, by the LM computing device, a location data message including the merchant identifier and the location of the mobile merchant, and causing, by the transmission, the consumer computing device to display the location on a display interface coupled to the consumer computing device.

In another aspect, a system for determining a location of a mobile merchant computing device associated with a mobile merchant is provided. The system comprises a database configured to store location data, and a location manager (LM) computing device configured to be coupled to the database. The LM computing device is configured to receive, from the mobile merchant computing device, at least one authorization request message including a merchant identifier for the mobile merchant and a first location variable, determine a location of the mobile merchant using the first location variable, transmit, to a consumer computing device operable by a consumer, a location data message including the merchant identifier and the location of the mobile merchant, and cause the consumer computing device to display the location on a display interface coupled to the consumer computing device.

In yet another aspect, a non-transitory computer readable medium that includes computer executable instructions for determining a location of a mobile merchant computing device is provided. When executed by a location manager (LM) computing device comprising a processor in communication with a memory device, the computer executable instructions cause the LM computing device to receive, from the mobile merchant computing device, at least one authorization request message including a merchant identifier for the mobile merchant and a first location variable, determine a location of the mobile merchant using the first location variable, transmit, to a consumer computing device operable by a consumer, a location data message including the merchant identifier and the location of the mobile merchant, and cause the consumer computing device to display the location on a display interface coupled to the consumer computing device.

BRIEF DESCRIPTION OF THE DRAWINGS

FIGS. 1-7 show example embodiments of the methods and systems described herein.

Like numbers in the Figures indicate the same or functionally similar components.

DETAILED DESCRIPTION

The systems and methods described herein use transaction data to determine a physical location of a mobile merchant. More specifically, the disclosure relates to using data transmissions sent by computer devices located at a mobile merchant to determine the mobile merchant's location. As a matter of background, a "mobile merchant" is any seller of goods or services whose location may be variable (e.g., a food truck, a snack merchant, farmer's market merchant, or the like). Data transmissions may include transaction data, which refers to data collected by, for example, a payment processor configured to process payment card transactions over a processing network. Transaction data may include transactions initiated by consumers with merchants using various payment accounts that may be associated with payment cards, such as credit cards, debit cards, or the like. Transaction data may also include merchant "location data," such as a street address, geographic coordinates, or the like. Data transmissions may also include any other type of communication between a mobile merchant computer device and a payment processor device.

In one embodiment, a Location Manager (LM) computing device is used to monitor and transmit mobile merchant "location data." More specifically, the LM computing device is configured to receive location data from at least one mobile merchant computing device, store that location data, and provide it to a consumer searching for that mobile merchant. Location data for the mobile merchant may refer to a current street address, geographic coordinates, or the like. A mobile merchant computing device may be a point of sale (POS) device (i.e., a computing device used to initiate or perform payment transactions). A mobile merchant computing device may also be a separate mobile merchant computing device configured to transmit location data or perform transactions, or do both. In at least some implementations, the LM computing device is in communication with a payment processor that processes payment transactions, such as payment transactions initiated with payment cards, (e.g., credit and debit cards). The payment processor is also in communication with issuing banks that issue payment cards to consumers, and acquiring banks that hold accounts for merchants, including mobile merchants. The payment processor is also connected to point-of-sale (POS) devices associated with merchants that transmit transaction data to the network (e.g., in the form of a message requesting authorization for a transaction). Finally, the LM computing device is also in communication with consumer computing devices to which the LM computing device transmits location data and from which the LM computing device receives requests regarding the location of mobile merchants from interested consumers.

The LM computing device is configured to receive location data in at least two ways. When a consumer performs a transaction at a POS device, an authorization request message is created that requests authorization for the transaction from an issuing bank, via the payment processor. As part of the authorization request message, transaction data is generated at the POS device. The POS device captures the current location of the mobile merchant (e.g., geographic coordinates such as latitude and longitude). The current location is included in the authorization request message. In one embodiment, the LM computing device receives the authorization request message and extracts location data derived from the authorization request message transmitted by the POS device. In other implementations, the LM computing device is configured to receive location data separate from the authorization request message (e.g., as part of a standalone web service call to the POS device). The LM computing device is configured to store location data in a memory device (e.g., a database server). The LM computing device is also configured to continuously update the stored location data. For example, after a mobile merchant's location data is stored, a subsequent authorization request message (or other communication from the POS device) may contain different location data, because the mobile merchant has moved. Accordingly, the LM computing device is configured to update its location data for the mobile merchant.

The LM computing device is also configured to transmit mobile merchant location data, such as to the consumer computing device. In at least some implementations, the consumer provides a mobile merchant identifier (e.g., a merchant name), consumer contact data (e.g., phone number, email address), and with a "location zone" (city, zip code, geographic coordinates, etc.) such that the consumer wishes to receive location data for the mobile merchant if a specific mobile merchant enters the location zone. The LM computing device is configured to transmit location data to the consumer computing device once that specific mobile merchant has entered the provided location zone. In other implementations, the LM computing device is configured to transmit location data for all mobile merchants present within the location zone, or within all location zones. In still other implementations, the LM computing device is configured to transmit location data for the specific mobile merchant regardless of whether it is currently in the location zone (i.e., the consumer may simply wish to locate the mobile merchant regardless of whether it is in the consumer's vicinity).

The LM computing device is also configured to push or send location messages to consumer computing devices. The location message is configured to activate the consumer computing device to display the location of the mobile merchant. In one embodiment, the LM computing device is configured to send location messages that cause the consumer computing device to switch an operational mode from inactive to active to display the location. For example, the location messages may cause the consumer computing device to switch from a "sleep mode" to an "active display mode" and display the location of the mobile merchant or an alert message indicating that location data is available at the consumer computing device.

To determine whether the mobile merchant is within the location zone, the LM computing device is configured to compare the location zone data provided by the consumer computing device and the location data provided by the mobile merchant computing device. In at least some implementations, the LM computing device compares corresponding data points between the location zone and the mobile merchant location data. For example, when the mobile merchant location data contains a zip code matching a zip code provided within the consumer's location zone data, the LM computing device determines that the mobile merchant is within the location zone and transmits location data to the consumer computing device.

In other implementations, the LM computing device compares a mobile merchant's location data to the consumer's provided location zone. The LM computing device is configured to perform the comparison at predetermined times (e.g., every 10 seconds, every minute, every hour, every day, or the like) or on a predetermined schedule (e.g., a schedule created by an operator of the LM computing device. Such schedules may be customized by location or time of year. For example, mobile merchants may be more active during certain seasons (e.g., summer) or times (e.g., the daytime vs. the nighttime, or during lunch hours) and there may be more interest in mobile merchants during these seasons or times. Accordingly, the LM computing device is configured to automatically adjust between seasonal schedules and, for example, perform the comparison between merchant location data and location zone data more frequently during certain seasons or times and less frequently during certain other seasons or times.

In still other implementations, location zone data may also include a consumer's (or consumer computing device's) current location and a radius such that the consumer wishes to receive location data for the mobile merchant when the mobile merchant is within a specified radius of the consumer computing device. In such implementations, the LM computing device is configured to determine whether geographic coordinates of the mobile merchant fall within an area bounded by the provided radius with the consumer's current location as its center. If so, the LM computing device transmits location data to the consumer computing device.

The LM computing device is also configured to perform statistical analysis of the received location data. The LM computing device is configured to provide a report of a particular mobile merchant's location over a period of time (e.g., a traversed path of the mobile merchant over the past 24 hours). Additionally, the LM computing device is also configured to analyze locations where the mobile merchant is most requested. For example, the LM computing device may provide the mobile merchant with the location zone where the most consumers request location data for the mobile merchant, indicating a location zone where the mobile merchant is most popular.

The technical problems addressed by this system include at least one of: (i) inability to use mobile merchant transaction data for location tracking systems, (ii) increased network load on location service systems due to redundant querying from consumers regarding mobile merchant location, (iii) inability of mobile merchants to generate location data and transmit it to a central site which can then broadcast their location, and (iv) incompatibility between mobile merchant computer systems and consumer computer devices, resulting in an inability to communicate across devices.

The methods and systems described herein may be implemented using computer programming or engineering techniques including computer software, firmware, hardware, or any combination or subset thereof, wherein the technical effects may be achieved by performing at least one of the following steps: (a) receiving from the mobile merchant computing device, by the LM computing device, at least one authorization request message including a merchant identifier for the mobile merchant and a first location variable, (b) determining, by the LM computing device, a location of the mobile merchant using the first location variable, (c) transmitting to a consumer computing device operable by a consumer, by the LM computing device, a location data message including the merchant identifier and the location of the mobile merchant, and (d) causing, by the transmission, the consumer computing device to display the location on a display interface coupled to the consumer computing device.

The resulting technical benefits achieved by this system include at least one of: (i) leveraging the ability of mobile merchant computer systems to broadcast location data, the ability of payment processor computer systems to process location data and associate it with payment transaction data, and the ability of consumer computer devices to receive processed location data and present it to consumers for tracking mobile merchant locations, (ii) integrating mobile merchant computer systems, payment processing computer systems, and consumer computer devices in a unitary system to offer mobile merchant location services, (iii) leveraging location data for mobile merchants to enable payment processing computer systems to perform useful statistical analysis on mobile merchants' financial performance by location, (iv) reducing technical incompatibility between consumer computer devices and mobile merchant computing systems, enabling mobile merchant computer systems to effectively transmit location data to consumer computer devices.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
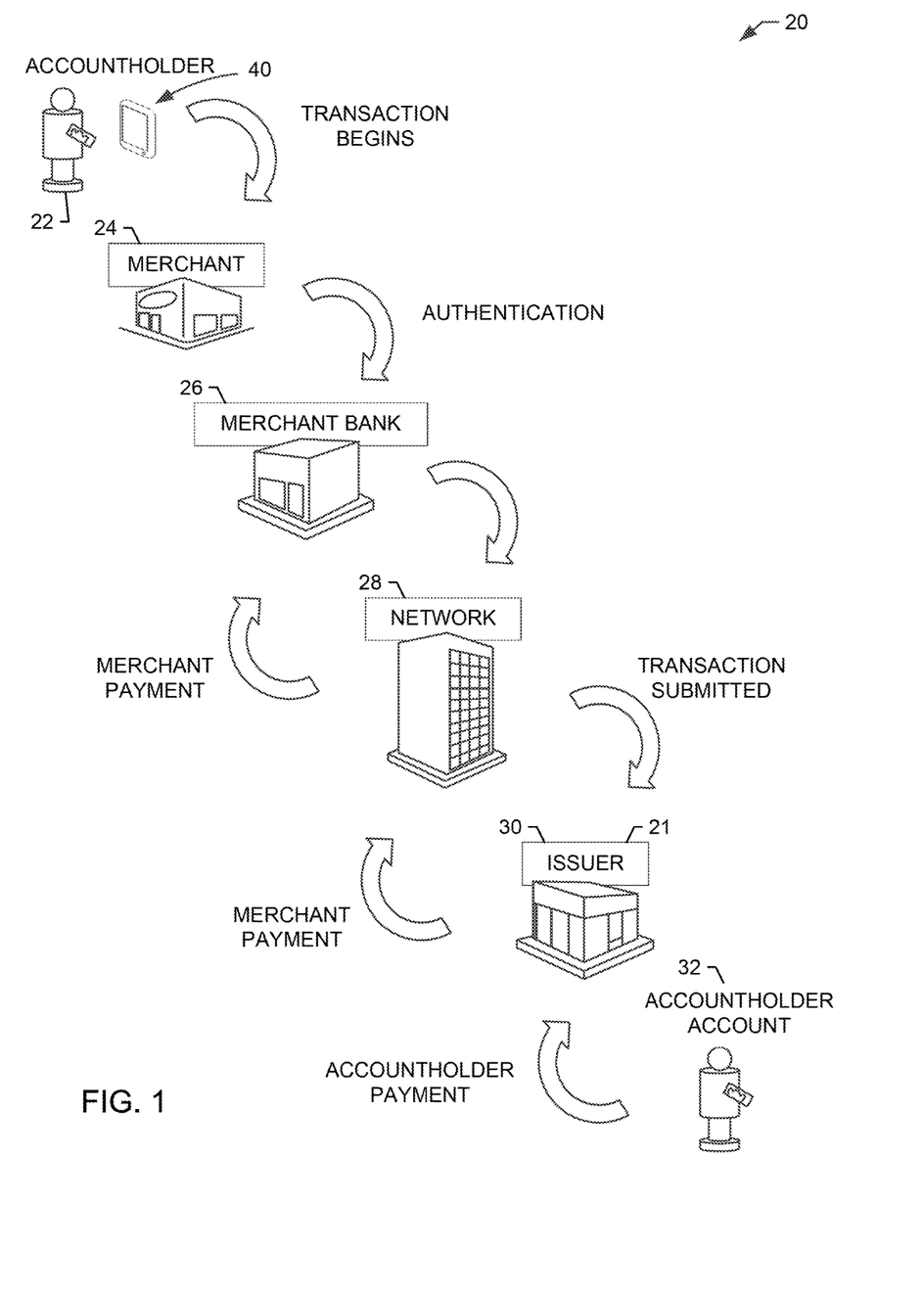
FIG. 1 is a schematic diagram illustrating an example multi-party transaction card industry system for authorizing payment card transactions in which parties provide processing services to various financial entities.

FIG. 1 is a schematic diagram illustrating an example multi-party transaction card industry system 20 for authorizing payment card transactions in which parties provide processing services to various financial entities. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to the consumer or accountholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." In one embodiment, accountholder 22 tenders payment for a purchase using a transaction card at a transaction processing device 40 (e.g., a point of sale device), then merchant 24 requests authorization from a merchant bank 26 for the amount of the purchase. The request is usually performed through the use of a point-of-sale terminal, which reads accountholder 22's account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether accountholder 22's account 32 is in good standing and whether the purchase is covered by accountholder 22's available credit line. Based on these determinations, the request for authorization will be declined or accepted. If the request is accepted, an authorization code is issued to merchant 24.

When a request for authorization is accepted, the available credit line of accountholder 22's account 32 is decreased. Normally, a charge for a payment card transaction is not posted immediately to accountholder 22's account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If accountholder 22 cancels a transaction before it is captured, a "void" is generated. If accountholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 3).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, accountholder 22, merchant 24, merchant bank 26, interchange network 28 (also referred to herein as payment processor 28), issuer bank 30, and/or an issuer processor 21.

Figure 2:
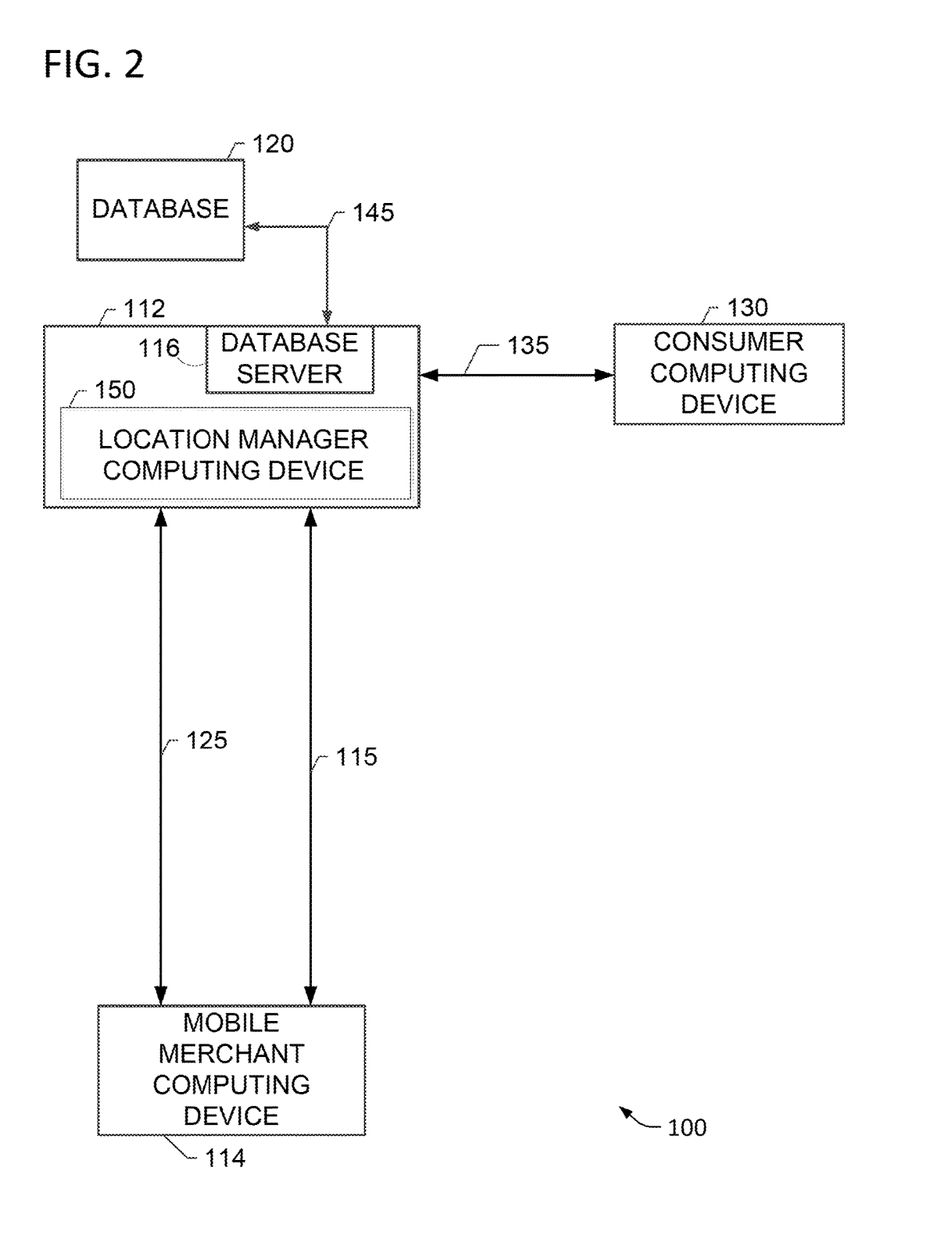
FIG. 2 is a block diagram of an example location management environment 100, in which a variety of computing devices are communicatively coupled to each other via a plurality of network connections.

FIG. 2 is a block diagram of an example location management environment 100, in which a variety of computing devices are communicatively coupled to each other via a plurality of network connections. These network connections may be Internet, LAN/WAN, or other connections capable of transmitting data across computing devices. Environment 100 shows a location manager (LM) computing device 150 and a database server 116. In one embodiment, LM computing device 150 and database server 116 are components of a location manager (LM) system 112. Server system 112 may be a server, a network of multiple computer devices, a virtual computing device, or the like. LM computing device 150 is connected to at least one consumer computing device 130 and a mobile merchant computing device 114 via at least a network connection 115 and network connection 125.

In one embodiment, LM computer device 150 is configured to receive location data as part of a transaction data message, over network connection 115. As noted with respect to FIG. 1, when a consumer performs a transaction at a merchant location, transaction data is generated. Transaction data may be transmitted across computer devices as a transaction data message. In one embodiment, when a consumer A performs a transaction at a mobile merchant associated with mobile merchant computer device 114, transaction data for consumer A's transaction is transmitted to server system 112. Server system 112 processes the transaction data in the manner described with respect to FIG. 1 and also provides it to LM computer device 150.

LM computer device 150 is configured to extract location-relevant data from transaction data and process it for transmission to consumer computer device 150. In one embodiment, LM computer device 150 parses the complete transaction data file searching for, filtering, or otherwise extracting location data. For example, LM computer device 150 may determine after parsing the complete transaction file that it contains a merchant address, or geographic coordinates. In another embodiment, location data is marked using one or more variables, location parameters, keys, headings, codes, flags, or any suitable computer-readable marker used to designate a section of data. LM computer device 150 is configured to detect that the transaction data file contains the particular marker and extract the associated location data.

In one embodiment, LM computing device 150 is configured to retrieve location data using Global Positioning System (GPS)-based location capabilities of mobile merchant computing device 114. For example, mobile merchant computing device 114 may be a GPS-enabled point-of-sale device that records and transmits its physical location.

The transaction data message may include a transaction amount, a transaction date, account data related to the payment card used to perform the transaction (e.g., primary account number associated with payment card, card expiration date, card issuer, card security code, or the like), a merchant identifier, stock-keeping unit (SKU) data relating to the goods or services purchased from the consumer, or the like. In one embodiment, the transaction data message also includes location data. Location data may take the form of a street address, geographic coordinates (latitude and longitude), cardinal point information (e.g., east, west, north, south), or any other method of denoting the physical location of a mobile merchant. Location data may also include path information. For example, a mobile merchant may transmit not just its current location, but its projected path in a predetermined future period of time. For example, location data may take the form of computer data messages that, when interpreted by a consumer computer device, will display "Mobile Merchant A is currently offering services near 321 Main Street."

In another embodiment, LM computer device 150 is configured to receive location data as part of a standalone location data message separate from a transaction data message, over network connection 125. A location data message may take the form of a web service call from LM computer device 150, a push notification from mobile merchant computer device 114, a periodic data transmission from mobile merchant computer device 114 to LM computer device 150, or any similar computer data communication configured to transmit location data from mobile merchant computer device 114 to LM computer device 150.

Relatedly, LM computer device 150 is configured to generate recently traveled path information given a predetermined number of data points for a mobile merchant's past location. For example, mobile merchant computer device 114 is associated with a beach side ice cream merchant. Mobile merchant computer device 114 may transmit three location data messages each showing mobile merchant computer device 114 at three locations in a straight line on a particular beachfront. LM computer device 150 is configured to interpret the three location data messages as indicating a recent path for mobile merchant computer device 114 down the beach front. This is especially useful where location data is transmitted as part of transaction data messages. For example, mobile merchant computer device 114 may transmit a transaction data message bearing location data from point A, such that LM computer device 150 processes this location data and provides it to consumer computer device 150. However, mobile merchant computer device 114 may move from point A without performing more transactions such that when a consumer arrives at point A, the mobile merchant has moved some distance from point A. Accordingly, LM computer device 150 is configured to provide a recent path for the mobile merchant to consumer computer device 130 based on past location patterns so that a consumer is more likely to physically locate a desired mobile merchant.

Moreover, LM computer device 150 is also configured to use statistical analysis to determine a future location for a mobile merchant, based on generated location patterns. LM computer device 150 is configured to track past locations for a mobile merchant and, once a mobile merchant exhibits the same location pattern more than a threshold number of times, generate a predicted location for the mobile merchant and provide it to consumer computer device 130. LM computer device 150 is configured to store location data in a location pattern data structure. For example, LM computer device 150 may store location data points in an array with location data points as elements in the array. LM computer device 150 may test new location data points against existing elements in the array to determine whether they are identical or sufficiently similar. Location data points may be added to the array when they are identical to previous elements in the array, such that the array represents a pattern of repeated visits to the same location. LM computer device 150 is configured to traverse the location pattern data structure and detect that an index of the data structure exceeds a predefined pattern threshold (i.e., the same location has been visited more than X number of times).

For example, given the beach side ice cream merchant example in the previous paragraph, LM computer device 150 may detect that mobile merchant computer device 114 has transmitted location data from the same beach front at the same time of day for the past three weekdays, but not on weekends. Given a pattern threshold of 2, LM computer device 150 may determine that the ice cream merchant is scheduled to be at the same stretch of beach front for the next two weekdays as well, but not on the ensuing weekend. LM computer device 150 is configured to provide a location prediction data message to consumer computer device 130 for the ice cream merchant. In one embodiment, the location prediction data message includes an identifier for the ice cream merchant, a predicted location for the ice cream merchant, and a predicted time at which the ice cream merchant is likely to be at the predicted location.

LM computer device 150 is also configured to transmit location alerts to consumer computer device 130. In one embodiment, consumer computer device 150 may provide certain location preferences to LM computer device 150. With regard to location preferences, a consumer may designate that the consumer wishes to receive an alert when a mobile merchant is within a certain radius of the consumer, or at a certain address, or in the same city as the consumer. In one embodiment, LM computer device 150 is configured to receive, from consumer computer device 130, a merchant identifier for the mobile merchant associated with mobile merchant computer device 114 (e.g., a merchant name), location preferences (e.g., "Alert me when merchant X is in my city") and a time period (e.g., "within the next month" or "anytime"). LM computer device 150 is configured to continuously track the location of mobile merchant computer device 114 and test whether the location matches location preferences and time periods provided by consumer computer device 130. In another embodiment, LM computer device 150 may receive a category of merchants (e.g., Korean barbecue food trucks), search a mobile merchant database for all merchants matching the category, and return location data for all such merchants to consumer computer device 130.

Database server 116 is connected to database 120, which contains information on a variety of matters, as described below in greater detail. In one embodiment, database 120 is stored on server system 112 and can be accessed by potential users of server system 112. In an alternative embodiment, database 120 is stored remotely from server system 112 and may be non-centralized.

Database 120 may include a single database having separated sections or partitions or may include multiple databases, each being separate from each other. Database 120 may store location data for each mobile merchant in communication with LM computing device 150. Location data may include data regarding a mobile merchant's past locations, special location-related messages sent by the mobile merchant (e.g., the mobile merchant may provide blackout dates where the mobile merchant is not operating, specific locations or paths, specific goods or services, or the like). Database 120 may also store consumer preference data, mobile merchant inventory data, mobile merchant location pattern data, or the like.

In the example embodiment, LM computing device 150 does not consist of generic computer hardware, nor does it require merely generic computer instructions to perform the above functions. Rather, LM computing device 150 is a specially designed and customized computer device built to perform the specific function of monitoring the location of a mobile merchant by receiving inputs from mobile merchant computing devices, processing those inputs, and generating outputs (e.g., location data) that are transmitted to other computing devices (e.g., consumer computing devices).

Figure 3:
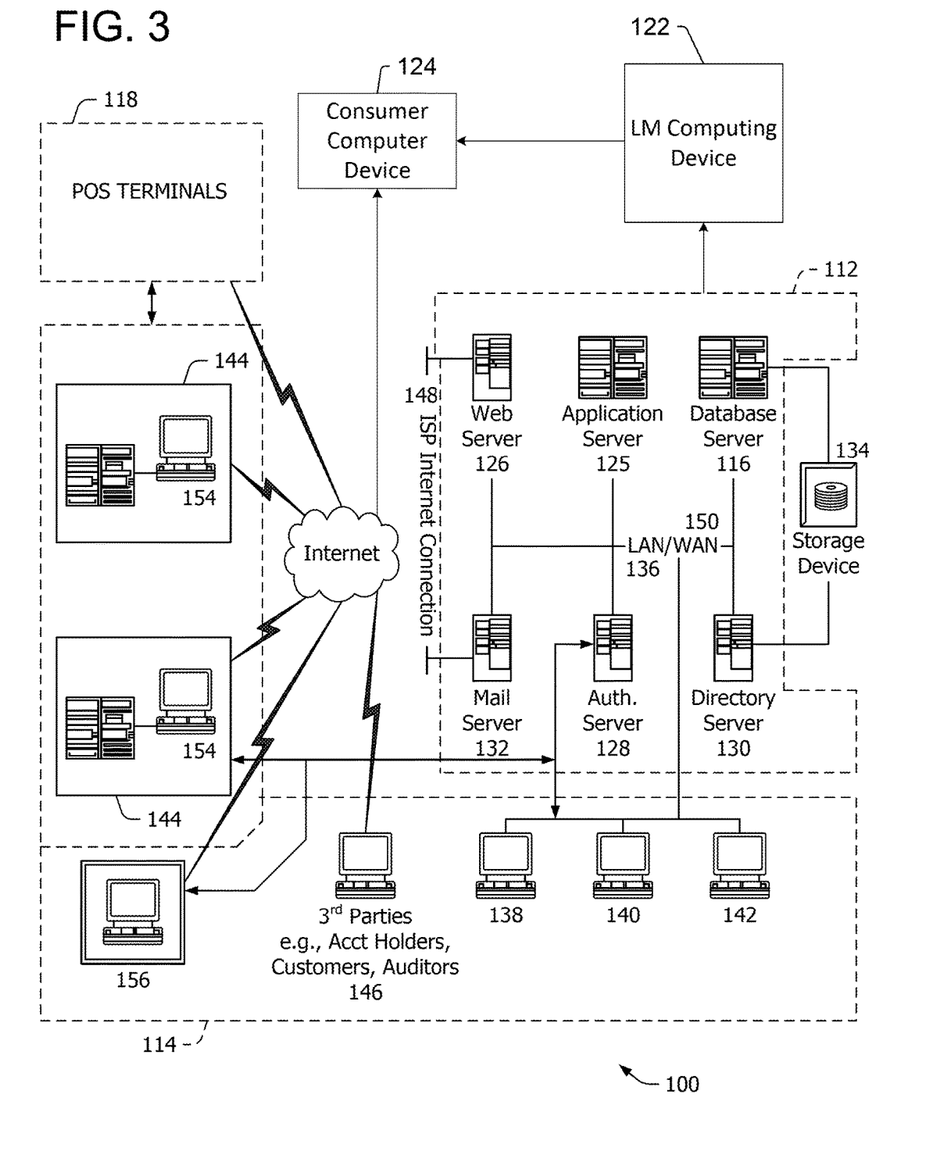
FIG. 3 illustrates an example configuration of a server system such as the LM computing device shown in FIG. 2.

FIG. 3 is an expanded block diagram of an example embodiment of server architecture of location management (LM) computer system 100 including other computer devices in accordance with one embodiment of the present disclosure. Components in LM computer system 100, identical to components of LM computer system 100 (shown in FIG. 2), are identified in FIG. 3 using the same reference numerals as used in FIG. 2. LM computer system 100 includes server system 112, mobile merchant computer devices 114, and POS terminals 118. Server system 112 further includes database server 116, a web server 126, a user authentication system 106, and an application server 125. A storage device 134 is coupled to database server 116. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network 115. Workstations 138, 140, and 142 are coupled to LAN 136 using an Internet link or are connected through an Intranet. In the example embodiment, LM computing device 122 is in communication with server system 112 and consumer computer device 124. Consumer computer 124 is also connected to the Internet and may be a smartphone, personal computer, tablet computer, or similar computing device. LM computing device 122 is configured to receive location data from mobile merchant computer devices 114 via server system 112, process the location data and cause it to be displayed on consumer computer device 124.

Each workstation 138, 140, and 142 is a computer with Internet access. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and third parties 146 (e.g., account holders, customers, auditors, developers, cardholders, merchants, acquirers, issuers, etc.), using an ISP Internet connection 148. The communication in the example embodiment is illustrated as being performed using the Internet. However, any other wide area network (WAN) type communication can be utilized in other embodiments. In other words, the systems and processes are not limited to being practiced using the Internet. In addition, and rather than WAN 150, local area network 136 could be used in place of WAN 150.

In the example embodiment, any authorized individual having a workstation 154 can access LM computer system 100. At least one of the client systems includes a manager workstation 156 located at a remote location. Workstations 154 and 156 are personal computers having a web browser. Also, workstations 154 and 156 are configured to communicate with server system 112. Furthermore, authentication server 128 communicates with remotely located client systems, including a client system 156 using a telephone link. Authentication server 128 is configured to communicate with other client workstations 138, 140, and 142 as well.

Figure 4:
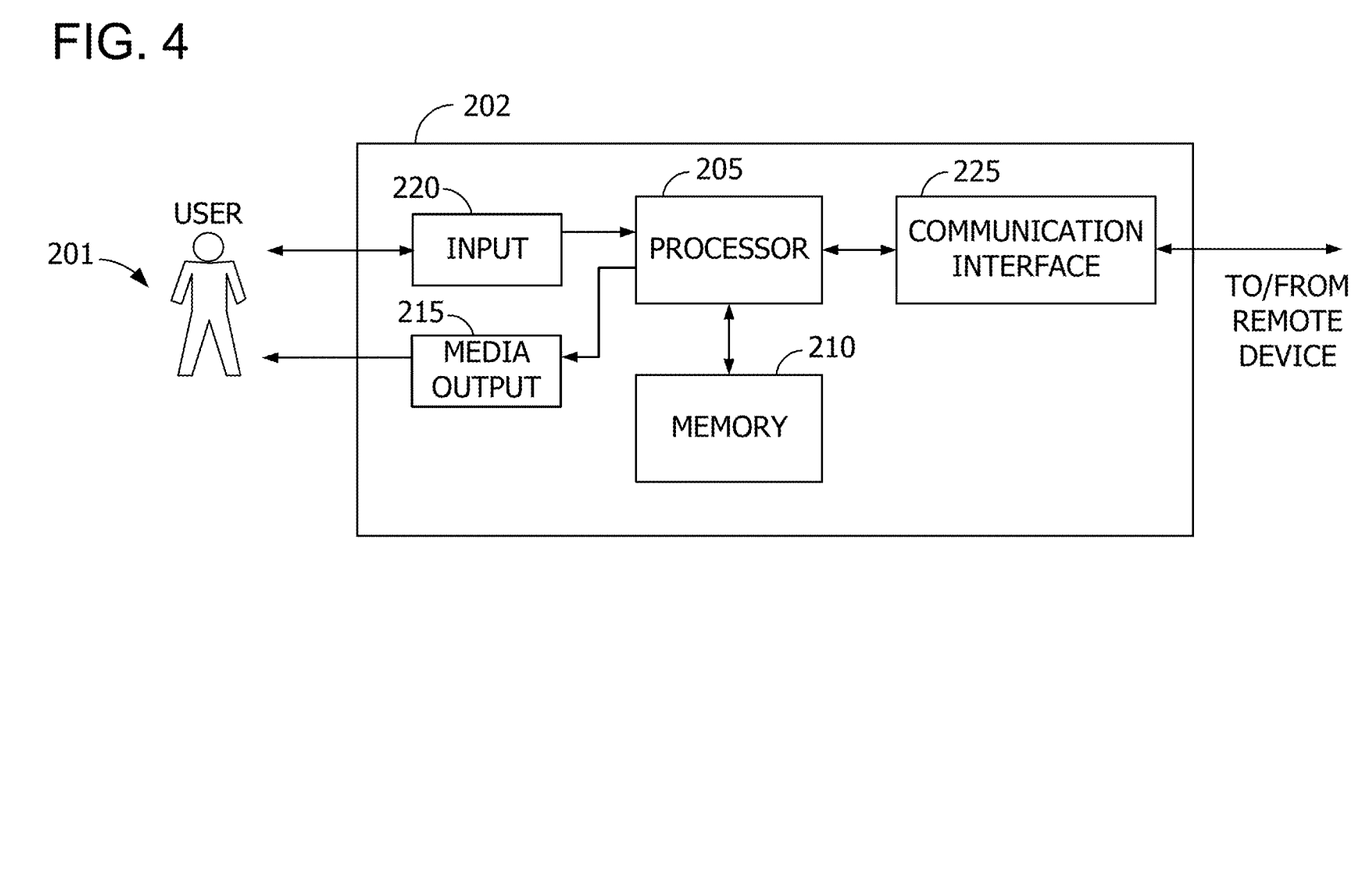
FIG. 4 illustrates an example configuration of a user system, such as a consumer computer device configured to receive location data for mobile merchants.

FIG. 4 illustrates an example configuration of a user system, such as a consumer computer device configured to receive location data for mobile merchants. User system 202 may include, but is not limited to, consumer computing device 130. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. For example, media output component 215 may be a display component configured to display component lifecycle data in the form of reports, dashboards, communications, or the like. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively connectable to a remote device such as Server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
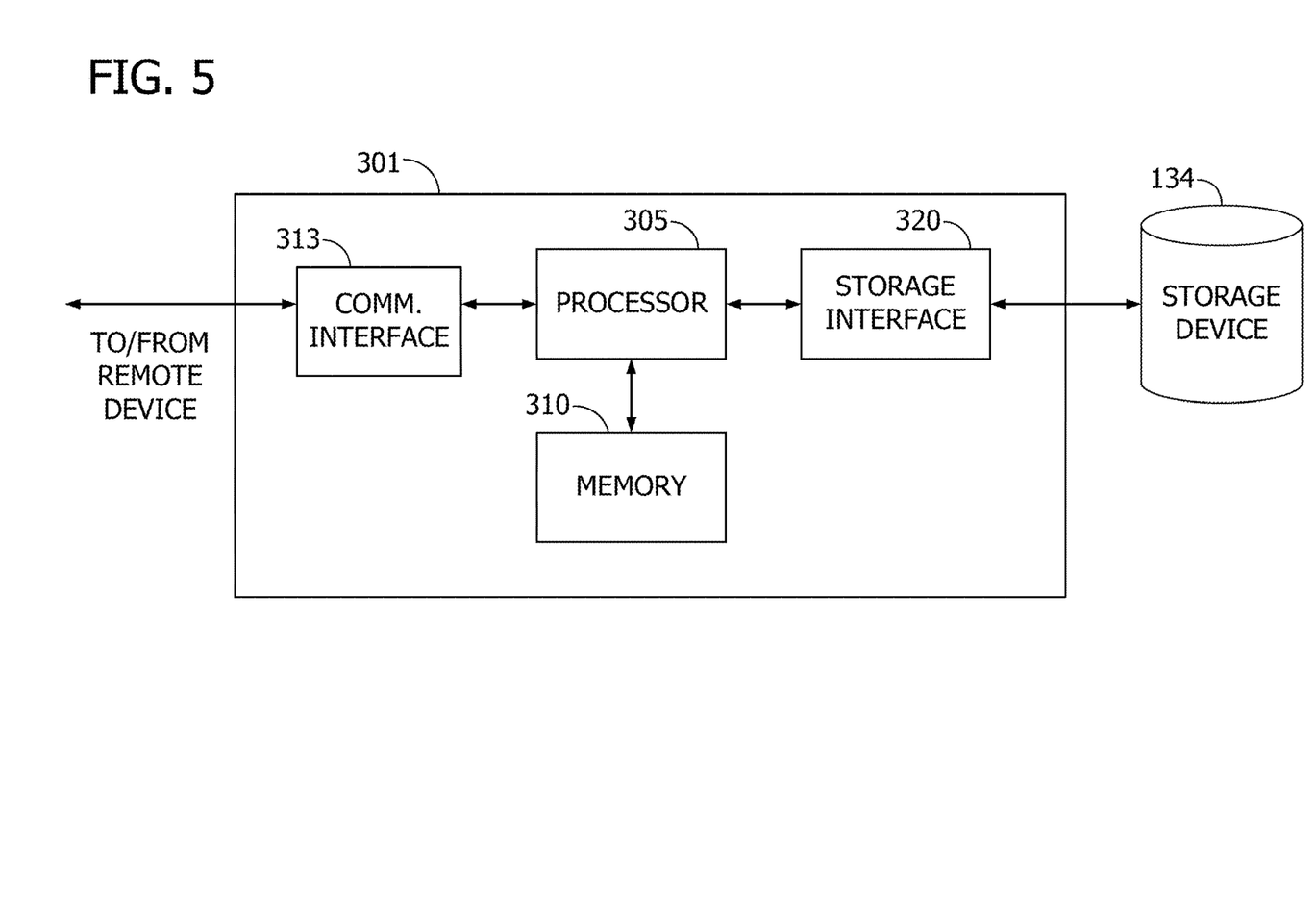
FIG. 5 illustrates an example configuration of a server system, such as an LM computer device configured to transmit location data for mobile merchants.

FIG. 5 illustrates an example configuration of a server system 301 such as the server system 112 shown in FIG. 2 that includes LM computing device 150. Server system 301 may include, but is not limited to, database server 116 or LM computing device 150 (shown in FIG. 2). In some embodiments, server system 301 is similar to server system 112 (shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in storage 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive communications from mobile merchant computing devices 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. In other embodiments, storage device 134 is external to server system 301 and is similar to database 120 (shown in FIG. 2). For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
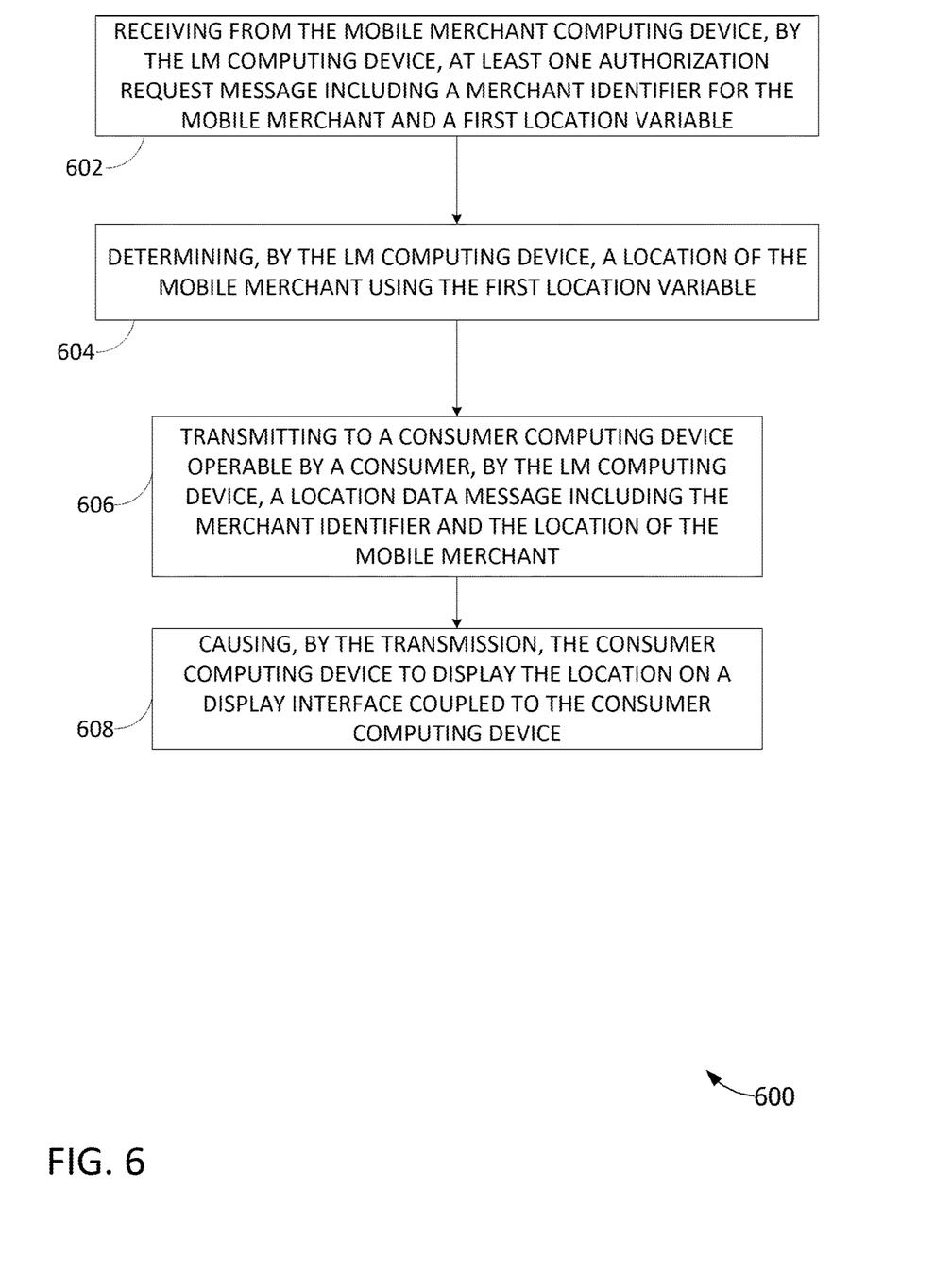
FIG. 6 shows an example method by which the LM computing device manages and transmits location data.

FIG. 6 shows an example method by which LM computing device 150 manages location for a mobile merchant. LM computing device 150 receives 602, from the mobile merchant computing device, at least one authorization request message including a merchant identifier for the mobile merchant and a first location variable. LM computing device 150 determines 604 a location of the mobile merchant using the first location variable. LM computing device 150 transmits 606, to a consumer computing device operable by a consumer, a location data message including the merchant identifier and the location of the mobile merchant. LM computing device 150 causes 608 the consumer computing device to display the location on a display interface coupled to the consumer computing device.

Figure 7:
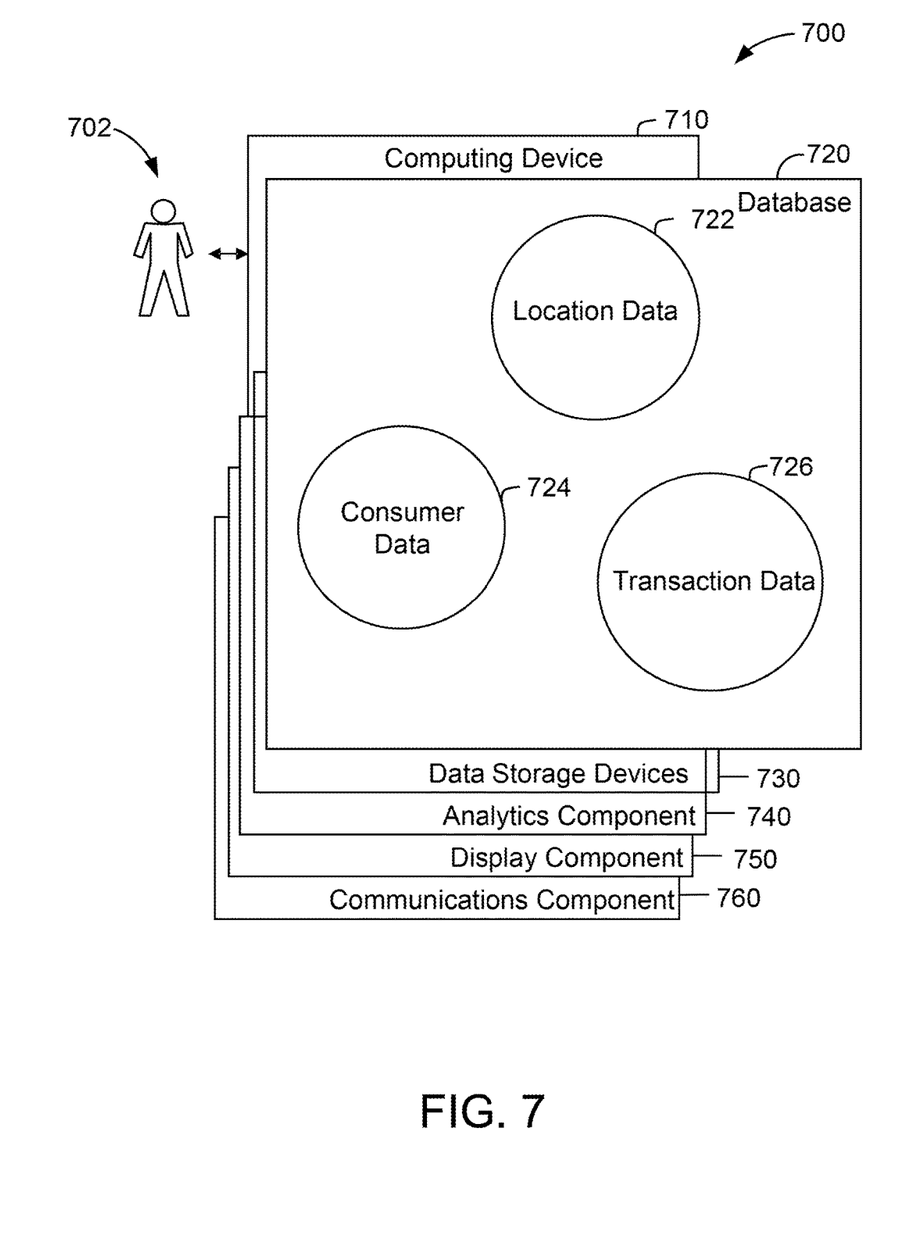
FIG. 7 shows an example configuration of a database within a computing device, along with other related computing components, that may be used to manage location data for mobile merchants.

FIG. 7 shows an example configuration of a database 700 within a computing device, along with other related computing components, that may be used to manage location data for mobile merchants. In some embodiments, computing device 710 is similar to server system 112 (shown in FIG. 2). User 702 (such as a consumer looking for mobile merchants) may access computing device 710 in order to manage location data. In some embodiments, database 720 is similar to database 120 (shown in FIG. 2). In the example embodiment, database 720 includes location data 722, consumer data 724, and transaction data 726. Location data 722 includes data regarding a mobile merchant's past and current location, location patterns for a mobile merchant, location for a mobile merchant in the form of addresses and geographic coordinates, special location-related messages sent by the mobile merchant or the like. Consumer data 724 includes consumer preference data, mobile merchant inventory data, mobile merchant location pattern data, or the like. Transaction data 726 includes transaction amounts, transaction dates, account data related to the payment card used to perform the transaction (e.g., primary account number associated with payment card, card expiration date, card issuer, card security code, or the like), merchant identifiers, stock-keeping unit (SKU) data relating to the goods or services purchased from the consumer, or the like Computing device 710 also includes data storage devices 730. Computing device 710 also includes analytics component 740 that processes location data received from various mobile merchant computing devices. Computing device 710 also includes display component 750 that receives processed mobile merchant location data from analytics component 740 and converts it into various formats in order to provide location data in a format compatible with various different consumer computing devices. Computing device 710 also includes communications component 760 which is used to communicate with consumer computing devices, and merchant computing devices, using predefined network protocols such as TCP/IP (Transmission Control Protocol/Internet Protocol) over the Internet.

As will be appreciated based on the foregoing specification, the above-described embodiments of the disclosure may be implemented using computer programming or engineering techniques including computer software, firmware, hardware or any combination or subset thereof, wherein the technical effect is to manage location data for a mobile merchant. Any such resulting program, having computer-readable code means, may be embodied or provided within one or more computer-readable media, thereby making a computer program product, (i.e., an article of manufacture), according to the discussed embodiments of the disclosure.

The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for determining a future location of a mobile merchant computing device associated with a mobile merchant, the method implemented using a location manager (LM) computing device comprising a processor in communication with a memory device, the method comprising:

receiving from the mobile merchant computing device through a payment processing network, by the LM computing device, a plurality of authorization request messages, each authorization request message associated with a payment transaction initiated with the mobile merchant, each authorization request message including a merchant identifier for the mobile merchant and a location variable identifying a location of the payment transaction, and wherein the mobile merchant computing device and the LM computing device are both communicatively coupled to the payment processing network;

identifying, using the LM computing device, the location variable for each of the plurality of authorization request messages;

extracting, using the LM computing device, the location variables from the plurality of authorization request messages;

determining, by the LM computing device, a plurality of locations for the mobile merchant using the location variables extracted from the plurality of authorization request messages;

generating, by the LM computing device, a plurality of location patterns for the mobile merchant from the determined plurality of locations;

determining, by the LM computing device, a number of times that the mobile merchant has followed a particular location pattern of the plurality of location patterns;

comparing, by the LM computing device, the determined number of times to a predetermined threshold number of times;

in response to determining that the number of times exceeds the predetermined threshold number of times, predicting, by the LM computing device, a future location for the mobile merchant;

transmitting to a consumer computing device, by the LM computing device, a location data message including the merchant identifier and the future location; and causing, by the transmission, the consumer computing device to display the future location on a display interface coupled to the consumer computing device.

2. A method in accordance with claim 1, further comprising receiving the location variables from the mobile merchant computing device independent of the plurality of authorization request messages.

3. A method in accordance with claim 1, further comprising:

receiving from the consumer computing device, by the LM computing device, a location request message including a location of interest, a second merchant identifier associated with the mobile merchant, and a consumer contact identifier;

comparing, by the LM computing device, the location of interest to the future location and the merchant identifier to the second merchant identifier; and based on the comparison, determining, by the LM computing device, that the location of interest identified in the location request message and the future location of the mobile merchant match.

4. A method in accordance with claim 3, wherein the consumer contact identifier includes one or more of: a telephone number, an email address, a social network address, and a messaging service address, and wherein comparing the future location to the location of interest comprises comparing one or more of a street identifier, a city identifier, a state identifier, a zip code identifier, and a set of geographic coordinates.

5. A method in accordance with claim 3, further comprising:

determining a location of the consumer computing device; and setting the location of interest equal to the determined location.

6. A method in accordance with claim 1, further comprising:

storing the location variable and the merchant identifier for each of the plurality of authorization request messages in the memory device;

associating the location variable and the merchant identifier for each of the plurality of authorization request messages in the memory device;

receiving at least one other authorization request message from the merchant computing device, including an updated location variable from the merchant computing device for at least one of the plurality of authorization request messages;

replacing the location variable with the updated location variable in the memory device for the at least one of the plurality of authorization request messages; and determining, using the location variable and the updated location variable, a recently traveled path of the mobile merchant.

7. A method in accordance with claim 1, further comprising:
receiving a registration data message from the consumer computing device; and
storing the consumer computing device as a registered device in the memory device.

8. A method in accordance with claim 1, wherein transmitting the location data message further comprises:
transmitting the location data message based on a schedule including one or more time intervals;
transmitting the location data message on demand from the consumer computing device; and
transmitting the location data message at a predetermined time.

9. A system for determining a future location of a mobile merchant computing device associated with a mobile merchant, the system comprising:
a database configured to store location data; and
a location manager (LM) computing device configured to be coupled to the database, the LM computing device further configured to:
receive, from the mobile merchant computing device through a payment processing network, a plurality of authorization request messages, each authorization request message associated with a payment transaction initiated with the mobile merchant, each authorization request message including a merchant identifier for the mobile merchant and a location variable identifying a location of the payment transaction, and wherein the mobile merchant computing device and the LM computing device are both communicatively coupled to the payment processing network;
identify the location variable for each of the plurality of authorization request messages;
extract the location variables from the plurality of authorization request messages;
determine a plurality of locations for the mobile merchant using the location variables extracted from the plurality of authorization request messages;
generate a plurality of location patterns for the mobile merchant from the determined plurality of locations;
determine a number of times that the mobile merchant has followed a particular location pattern of the plurality of location patterns;
compare the determined number of times to a predetermined threshold number of times;
in response to determining that the number of times exceeds the predetermined threshold number of times, predict, by the LM computing device, a future location for the mobile merchant;
transmit, to a consumer computing device, a location data message including the merchant identifier and the future location; and
cause the consumer computing device to display the future location on a display interface coupled to the consumer computing device.

10. A system in accordance with claim 9, wherein the LM computing device is further configured to receive the location variables from the mobile merchant computing device independent of the plurality of authorization request messages.

11. A system in accordance with claim 9, wherein the LM computing device is further configured to:

receive, from the consumer computing device, a location request message including a location of interest, a second merchant identifier associated with the mobile merchant, and a consumer contact identifier;
compare the location of interest to the future location and the merchant identifier to the second merchant identifier; and
based on the comparison, determine that the location of interest identified in the location request message and the future location of the mobile merchant match.

12. A system in accordance with claim 11, wherein the LM computing device is further configured to:
determine a location of the consumer computing device; and
set the location of interest equal to the determined location.

13. A system in accordance with claim 9, wherein the LM computing device is further configured to:
store the location variable and the first merchant identifier for each of the plurality of authorization request messages in the memory device;
associate the location variable and the merchant identifier for each of the plurality of authorization request messages in the memory device;
receive at least one other authorization request message from the merchant computing device, including an updated location variable from the merchant computing device for at least one of the plurality of authorization request messages; and
replace the location variable with the updated location variable in the memory device for the at least one of the plurality of authorization request messages.

14. A system in accordance with claim 9, wherein the LM computing device is further configured to:
receive a registration data message from the consumer computing device; and
store the consumer computing device as a registered device in the memory device.

15. A non-transitory computer readable medium that includes computer executable instructions for determining a future location of a mobile merchant computing device, wherein when executed by a Location manager (LM) computing device comprising a processor in communication with a memory device, the computer executable instructions cause the LM computing device to:
receive, from the mobile merchant computing device through a payment processing network, a plurality of authorization request messages, each authorization request message associated with a payment transaction initiated with the mobile merchant, each authorization request message including a merchant identifier for the mobile merchant and a location variable identifying a location of the payment transaction, and wherein the mobile merchant computing device and the LM computing device are both communicatively coupled to the payment processing network;
identify the first location variable for each of the plurality of authorization request messages;
extract the location variables from the plurality of authorization request messages;
determine a plurality of locations for the mobile merchant using the location variables extracted from the plurality of authorization request messages;
generate a plurality of location patterns for the mobile merchant from the determined plurality of locations;

determine a number of times that the mobile merchant has followed a particular location pattern of the plurality of location patterns;

compare the determined number of times to a predetermined threshold number of times;

in response to determining that the number of times exceeds the predetermined threshold number of times, predict a future location for the mobile merchant;

transmit, to a consumer computing device, a location data message including the merchant identifier and the future location; and cause the consumer computing device to display the future location on a display interface coupled to the consumer computing device.

16. A non-transitory computer readable medium in accordance with claim 15, wherein the computer-executable instructions cause the LM computing device to receive the location variables from the mobile merchant computing device independent of the plurality of authorization request messages.

17. A non-transitory computer readable medium in accordance with claim 15, wherein the computer-executable instructions cause the LM computing device to:

receive, from a consumer computing device, a location request message including a location of interest, a second merchant identifier associated with the mobile merchant, and a consumer contact identifier;

compare the location of interest to the future location and the first merchant identifier to the second merchant identifier; and based on the comparison, determine that the location of interest identified in the location request message and the future location of the mobile merchant match.

18. A non-transitory computer readable medium in accordance with claim 15, wherein the computer-executable instructions cause the LM computing device to:

store the location variable and the merchant identifier for each of the plurality of authorization request messages in the memory device;

associate the location variable and the merchant identifier for each of the plurality of authorization request messages in the memory device;

receive at least one other authorization request message from the merchant computing device, including an updated location variable from the merchant computing device for at least one of the plurality of authorization request messages; and replace the location variable with the updated location variable in the memory device for the at least one of the plurality of authorization request messages.

19. A non-transitory computer readable medium in accordance with claim 15, wherein the computer-executable instructions cause the LM computing device to:

transmit the location data message based on a schedule including one or more time intervals;

transmit the location data message on demand from the consumer computing device; and transmit the location data message at a predetermined time.

20. A non-transitory computer readable medium in accordance with claim 15, wherein the computer-executable instructions cause the LM computing device to:

receive a registration data message from the consumer computing device; and store the consumer computing device as a registered device in the memory device.

* * * * *